United States Patent
Honda (10) Patent No.: US 9,208,407 B2
(45) Date of Patent: Dec. 8, 2015

(54) IMAGE FORMING APPARATUS HAVING A DISPLAY SECTION AND A LIGHTING SECTION

(71) Applicant: Sharp Kabushiki Kaisha, Osaka (JP)

(72) Inventor: Yutaro Honda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 90 days.

(21) Appl. No.: 13/674,183

(22) Filed: Nov. 12, 2012

(65) Prior Publication Data

US 2013/0120795 A1 May 16, 2013

(30) Foreign Application Priority Data

Nov. 14, 2011 (JP) ................................ 2011-248229
Nov. 14, 2011 (JP) ................................ 2011-248230

(51) Int. Cl.
*G06F 3/12* (2006.01)
*G06K 15/00* (2006.01)
*G03G 15/00* (2006.01)

(52) U.S. Cl.
CPC .............. *G06K 15/00* (2013.01); *G03G 15/502* (2013.01); *G03G 15/5016* (2013.01); *G03G 2215/00109* (2013.01)

(58) Field of Classification Search
CPC .......... G03G 15/5004; G03G 15/5016; G03G 15/502; G03G 2310/0237; G03G 2310/064; G06F 1/3284; G06F 1/3287; G06F 3/1221; H04N 1/00411; H04N 1/00477; H04N 1/00896; G02F 1/1336; G02F 1/133602; G02F 1/133608
USPC .............................. 358/1.15; 400/76; 345/102
See application file for complete search history.

(56) References Cited

U.S. PATENT DOCUMENTS

| | | | |
|---|---|---|---|
| 8,467,094 B2* | 6/2013 | Takahashi | 358/1.14 |
| 2004/0190026 A1* | 9/2004 | Yamazaki et al. | 358/1.13 |
| 2004/0252342 A1* | 12/2004 | Kawahira | 358/1.2 |
| 2007/0146303 A1 | 6/2007 | Kaminosono et al. | |
| 2010/0002009 A1* | 1/2010 | Takata | 345/102 |
| 2010/0253963 A1* | 10/2010 | Amano | 358/1.14 |
| 2011/0142519 A1* | 6/2011 | Tsukuda | 400/76 |
| 2011/0249035 A1 | 10/2011 | Arai | |
| 2012/0069375 A1* | 3/2012 | Sasakura | 358/1.13 |
| 2013/0083338 A1* | 4/2013 | Fahrenkrug et al. | 358/1.13 |

FOREIGN PATENT DOCUMENTS

| | | |
|---|---|---|
| JP | 04-038162 U | 3/1992 |
| JP | 10-202844 A | 8/1998 |
| JP | 2003-131193 A | 5/2003 |

(Continued)

*Primary Examiner* — Benny Q Tieu
*Assistant Examiner* — Juan M Guillermety
(74) *Attorney, Agent, or Firm* — Renner, Otto, Boisselle & Sklar, LLP (57) ABSTRACT

An image forming apparatus includes an operating section accepting an operation by a user, a receiving section receiving data for a print job from an externally connected instrument, an image forming section starting an image forming based on a print job if the operating section accepts an operation to start the print job or if the receiving section receives data for the print job, a display section displaying varieties of information for printing on a display area, a lighting section illuminating the display section from a back portion thereof, and a control section causing lighting of the lighting section to be turned off gradually part by part until finally turned off entirely if entire lighting of the lighting section is in a state of keeping being turned on when the image forming section starts an image forming.

11 Claims, 9 Drawing Sheets

(56) References Cited

FOREIGN PATENT DOCUMENTS

| | | |
|---|---|---|
| JP | 2003-161926 A | 6/2003 |
| JP | 2003-279927 A | 10/2003 |
| JP | 2003-288054 A | 10/2003 |
| JP | 2007-181096 A | 7/2007 |
| JP | 2008-299242 A | 12/2008 |

* cited by examiner

FIG.7A  LIGHT HAS BEEN TURNED OFF FROM BEFORE A PRINT JOB IS RUN.

FIG.7B  A PREDETERMINED PERIOD OF TIME HAS PASSED SINCE THE LAST OPERATOR'S OPERATION AT MFP.

FIG.7C  A PRINT JOB IS RUN BY AN OPERATOR AT MFP DURING THE PASSAGE OF THE PREDETERMINED PERIOD OF TIME.

FIG.7D  MFP IS OPERATED DURING A RUNNING PRINT JOB.

□ ··· LIGHT-ON
■ ··· LIGHT-OFF

□ ··· LIGHT-ON
■ ··· LIGHT-OFF

□ ··· LIGHT-ON
■ ··· LIGHT-OFF

□ ··· LIGHT-ON
■ ··· LIGHT-OFF

FIG.9H

IMAGE FORMING APPARATUS HAVING A DISPLAY SECTION AND A LIGHTING SECTION

CROSS REFERENCE

This Nonprovisional application claims priority under 35 U.S.C. §119(a) on Patent Application No. 2011-248229 filed in Japan on Nov. 14, 2011, and on Patent Application No. 2011-248230 filed in Japan on Nov. 14, 2011, the entire contents of which are hereby incorporated by reference.

BACKGROUND OF THE INVENTION

The present invention relates to an image forming apparatus turning off a back light of a display section after the passage of a predetermined period of time without any operations.

An Image forming apparatus is provided with a LCD (liquid crystal display) panel displaying information on copying and/or printing performed by a main body. Also, the image forming apparatus is provided with a back light in the back portion of the LCD panel to improve visibility of the information displayed on the LCD panel.

Among the conventional image forming apparatus is one that turns off the back light to save power consumption thereof when a state continues for a predetermined period of time where there is no user's operation.

However, in the conventional image forming apparatus above the back light illuminates its entire display area of the LCD panel until it is turned off. In other words, the light illuminates not only a region displaying information but also a region not displaying any information. Therefore, there is still room for more power saving on the back light.

There, an invention on an image forming apparatus has been disclosed in which a plurality of back lights are provided on the rear side of the LCD panel that only illuminate positions corresponding to positions at which character information is displayed selectively (refer to Japanese Patent Unexamined Publication No. 2003-279927 bulletin).

Application of the invention disclosed in the patent literature above to the conventional image forming apparatus can further reduce power consumption of the back light.

However, it is often the case that users of the image forming apparatus either do not look at any information displayed on the LCD panel at all or only look at part of the information after having operated a copy start button. For example, when the number of sheets to copy is small, a user, watching the printed matter being discharged from the paper discharge section and watching that the discharge of the printed matter is completed, then takes it away without looking at the information displayed on the LCD panel. Also, when the image forming apparatus is performing a plurality of print jobs consecutively, the user only looks at part of the information such as current status of an ongoing print job and/or order in a queue of the print job the user has ordered, and so forth. Moreover, when a user orders a run of a print job to the image forming apparatus from a personal computer, the user cannot look at the information displayed on the LCD panel of the image forming apparatus.

Thus, in the conventional image forming apparatus to which the invention that is disclosed in Japanese Patent Unexamined Publication No. 2003-279927 bulletin is applied, there is room for reduction in power consumption of the back light.

Therefore, the present invention is directed to providing an image forming apparatus capable of further reducing power consumption of a back light.

SUMMARY OF THE INVENTION

An image forming apparatus of the present invention includes an operating section, a receiving section, an image forming section, a display section, a lighting section and a control section. The operating section accepts an operation by a user. The receiving section receives data for a print job from an externally connected instrument. The image forming section starts an image forming based on the print job, if the operating section accepts an operation to start a print job or if the receiving section receives data for a print job. The display section displays varieties of information for printing on a display area. The lighting section illuminates the display section from a back portion thereof. The control section causes lighting of the lighting section to be turned off gradually part by part, until it is finally turned off entirely, if entire part of the lighting of the lighting section is kept turned on when an image forming is started.

It is often the case that users of the image forming apparatus either do not look at any information displayed on the display screen at all or only look at part of the information after having operated a print start button. Thus, in the present invention, if entire part of the lighting of the lighting section is kept turned on when an image forming is started, the lighting of the lighting section is caused to be turned off gradually part by part, until it is finally turned off entirely. This enables power consumption of the lighting section to decrease gradually, thereby making it possible to reduce the power consumption drastically as compared with the case where the entire part of the lighting of the lighting section is turned off after the passage of a predetermined period of time.

In the above-mentioned invention, if the operating section accepts an operation during the time that the image forming section is performing an image forming and that the lighting of the lighting section is kept turned off, the control section causes part of the lighting of the lighting section to be turned on, and causes a partial display region illuminated by the part of the lighting of the lighting section to display information.

With the invention, the image forming apparatus causes the lighting of the lighting section to be turned off at the start of an image forming, and let a user who wants to look at information operate the operating section, thereby causing part of the lighting of the lighting section to be turned on and displaying the information. This can yield a reduction in power consumption of the lighting section in the meantime because the lighting of the lighting section is kept turned off until a user operates the operating section. Additionally, because it is part of the lighting of the lighting section that is turned on, the power consumption can be reduced as compared with the case where the entire lighting of the lighting section is turned on. Besides, the information a user needs to know can be displayed while the reduction in power consumption of the lighting section is achieved.

In the above-mentioned invention, the control section includes a function to control content displayed on the display area of the display section, and causes the partial display region to display specified information.

With the invention, since the specified information is caused to be displayed on the partial display region which is a partial region of the display area, displaying the information the user needs gathered together on the partial display region makes it possible to display the information a user needs to know while reducing power consumption of the lighting section.

The specified information to display therefore includes the information needed by the user such as current status of an ongoing print job the image forming section is performing and/or information on order in a queue of print jobs the image forming section performs, and so forth.

In the above-mentioned invention, the image forming apparatus includes a touch operating section. The touch operating section is installed in a front portion of the display section, and accepts a touching operation by a user. The control section includes a function to control the content displayed on the display area of the display section, and causes the partial display region to display a display button, and causes the partial display region to display the specified information if the touch operating section accepts a touching operation of the display button.

With the invention, if the operating section accepts an operation during the time that the image forming section is performing an image forming and that the lighting of the lighting section is kept turned off, the display button is displayed on the partial display region. Then, touching the display button displayed on the display section can cause the partial display region to display the specified information. This can help keep on suppressing the power consumption even if the touch operating section is mistakenly operated during the time that the image forming apparatus is performing an image forming process, because only the display button is displayed then. Also, what is required when a user wants to look at necessary information is just touching the display button, which makes it easy for the user to check the information.

In the above-mentioned invention, if the operating section or the touch operating section accepts the specified operation during the time that the image forming section is performing an image forming and that part of the lighting of the lighting section is kept turned on, the control section causes the entire lighting of the lighting section to be turned on.

With the invention, when a user wants to do a setting for a new print job or the like, the entire lighting of the lighting section can be turned on by carrying out a specified operation at the operating section or the touch operating section. For example, the above is implemented in such a manner that the entire lighting of the lighting section is turned on if an all-lights-on button provided in the operating section is operated or if a touching operation is made to a display area of which part of the lighting of the lighting section is turned off in the touch operating section. By such a simple operation, the lighting of the lighting section can be caused to be entirely turned on.

In the above-mentioned invention, if the lighting of the lighting section is partly kept turned on when the image forming section finishes the image forming the control section causes the entire lighting of the lighting section to be turned off.

With the invention, the entire lighting of the lighting section is turned off when the image forming is finished, since it becomes unnecessary to display on the partial display region the information relating to the print job. This can yield a reduction in power consumption of the lighting section.

In the above-mentioned invention, if the operating section or the touch operating section accepts an operation during the time that the image forming section is waiting for an image forming and that the entire lighting of the lighting section is kept turned off, the control section causes the entire lighting of the lighting section to be turned on.

Because a user operates the operating section or the touch operating section when carrying out a setting for an image forming during the time that an image forming is waited for, causing the entire display area to be illuminated then make it possible to accept the print job.

In the above-mentioned invention, the operating section is provided with a light-off button causing the entire lighting of the lighting section to be turned off. With the invention, the user, who has caused part of the lighting of the lighting section to be turned on by operating the operating section or the touch operating section, can cause the entire lighting of the lighting section to be turned off by operating the light-off button. This can yield a reduction in power consumption at the time when display becomes unnecessary after the display has been looked at.

The invention makes it possible to further reduce power consumption of the lighting section.

In the above-mentioned invention, the control section causes the partial display region illuminated by part of the lighting of the lighting section turned on to display information representing current status of an ongoing image forming performed by the image forming section until the entire lighting of the lighting section is turned off.

It is often the information representing current status of an ongoing image forming performed by the image forming section that users of the image forming apparatus look at after a start of the image forming. With present invention, during the time that part of the lighting of the lighting section is kept turned on, minimum information the user needs is displayed. This permits the user to check necessary information without operating the operating section.

BRIEF DESCRIPTION OF THE DRAWINGS

FIG. 4(D) is an example of display of an image when part of the plurality of back light elements are turned on.

FIG. 4(E) is an example when the part of the plurality of back light elements are turned on.

FIG. 6(C) is a diagram showing a state in which part of the plurality of back light elements are turned on.

FIG. 6(E) is a diagram showing a state in which about half the numbers of the plurality of back light elements are turned on.

FIG. 6(G) is a diagram showing a state in which all of the plurality of back light elements are turned on.

FIGS. 7(A)-7(D) are time charts showing a light-on/light-off control of the back light, where:

FIG. 9(A) is a diagram showing a state in which all of the plurality of back light elements are turned on.

FIG. 9(C) is a diagram showing a state in which about half the numbers of the plurality of back light elements are turned on.

FIG. 9(E) is a diagram showing a state in which part of the plurality of back light elements are turned on.

DETAILED DESCRIPTION OF THE INVENTION

Hereinafter, an example is explained in which the present invention is applied to a digital multifunctional apparatus installed in an office.

[Configuration of an Image Forming System]

Figure 1:
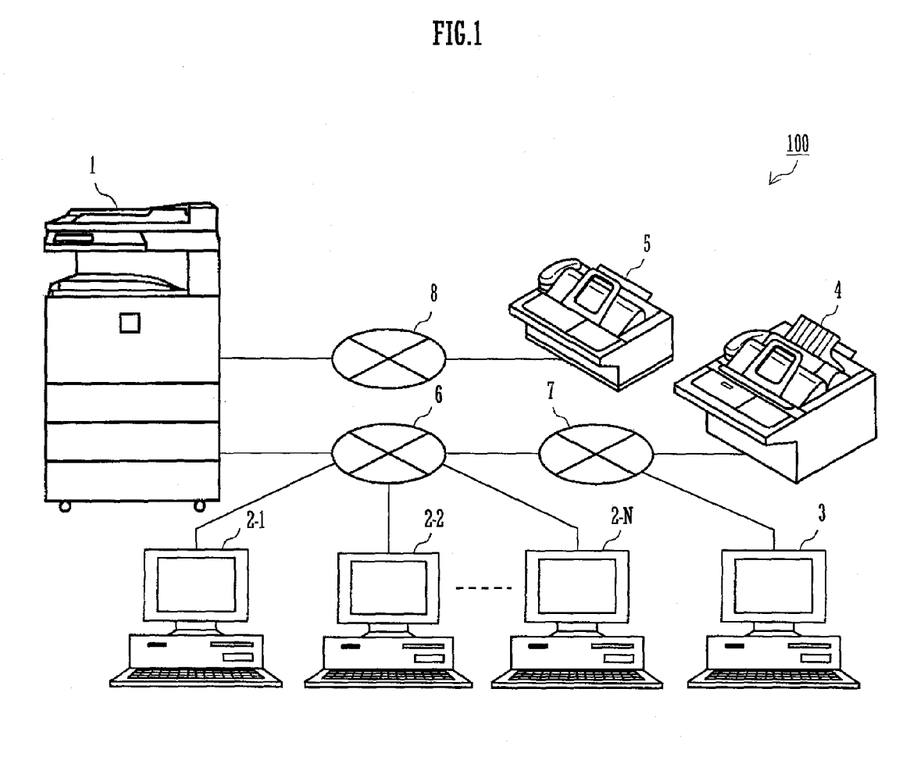
FIG. 1 is an example of a configuration diagram of a printing system including an image forming apparatus according to an embodiment of the present invention.

As shown in FIG. 1, an image forming system 100 includes a digital multifunctional apparatus (merely referred to as multifunctional apparatus, hereinafter) 1, N units of computers 2-1 through 2-N, a computer 3, an Internet Fax apparatus 4 and a Fax machine 5.

The multifunctional apparatus 1 and the computers 2-1 through 2-N are connected to a LAN 6 laid in the office. The computer 3, the Internet Fax apparatus 4 and the LAN 6 are connected to the Internet network 7. Also, the multifunctional apparatus 1, the Fax machine 5 and the mobile phone 61 are connected to the dial-up line network 8. Hereinafter, the computers 2-1 through 2-N, the computer 3, the Internet Fax apparatus 4 and the fax machine 5 are also referred to as externally connected instruments of the multifunctional apparatus 1.

[Configuration and Fundamental Functions of an Image Forming Apparatus]

Figure 2:
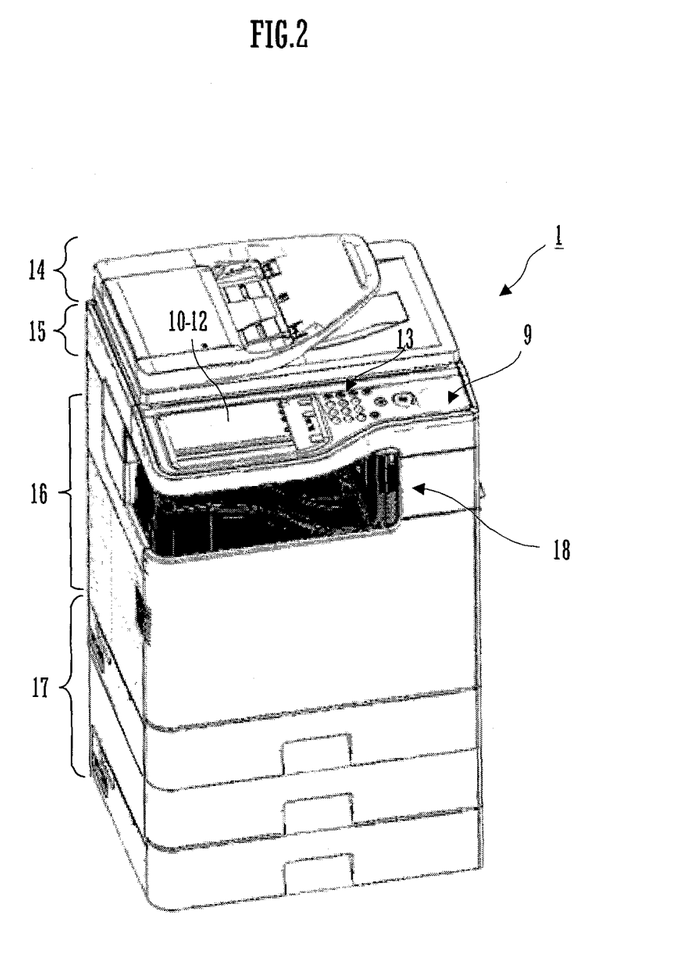
FIG. 2 is an external view of the image forming apparatus.
Figure 3:
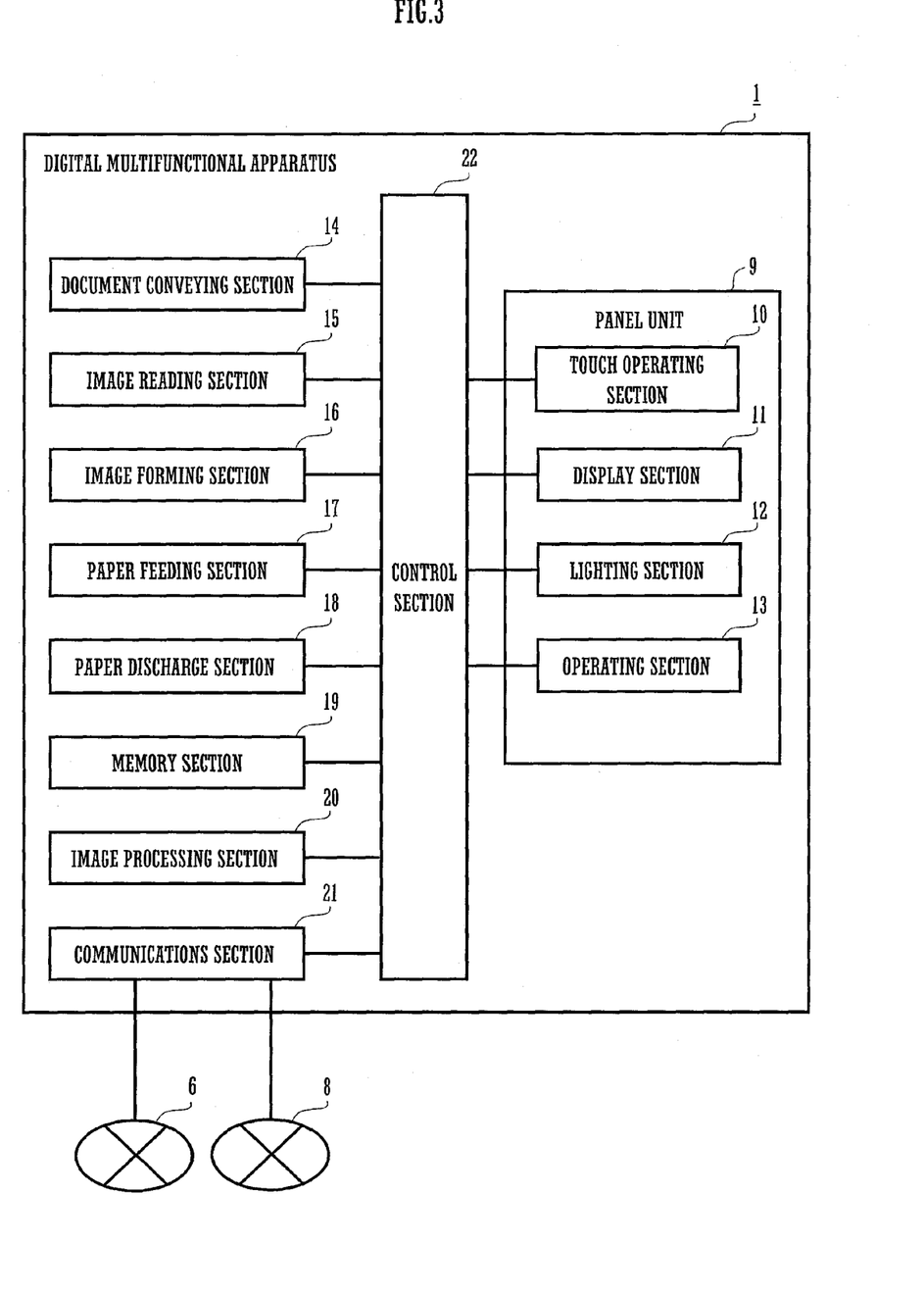
FIG. 3 is a block diagram of the image forming apparatus.

As shown in FIG. 2 and FIG. 3, the multifunctional apparatus 1, being of intra-body discharge type, is provided with a panel unit 9 on the near side on a top face of an apparatus main body. The panel unit 9 includes a touch operating section 10, a display section 11, a lighting section 12 and an operating section 13. Also, the multifunctional apparatus 1 is provided with a document conveying section 14, an image reading section 15, an image forming section 16 and a paper feeding section 17 in this order toward the direction from the upper part to the lower part of the main body. Additionally, the multifunctional apparatus 1 is provided with a paper discharge section 18 under the image reading section 15 and the panel unit 9. Further, the multifunctional apparatus 1 includes a memory section 19, an image processing section 20, a communications section 21 and a control section 22 in the main body. The control section 22 controls the respective sections of the multifunctional apparatus 1.

Figure 4A:
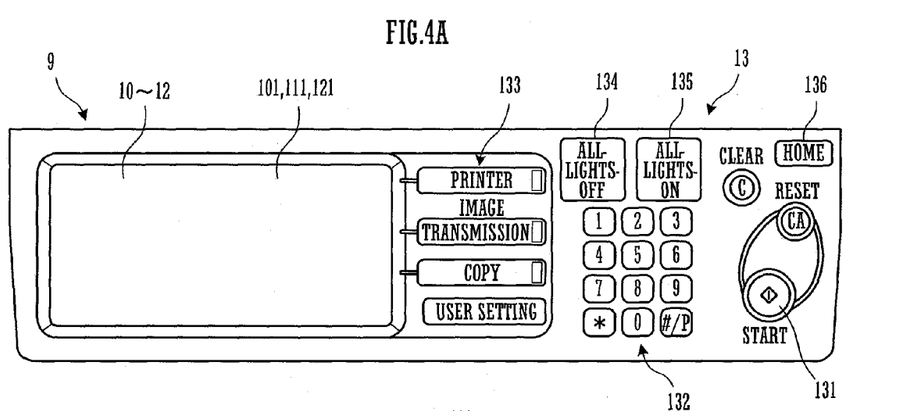
FIG. 4(A) is an external view of a panel unit.

The touch operating section 10, the display section 11 and the lighting section 12 are disposed at a left portion of the panel unit 9 shown in FIG. 4(A). The display section 11 includes a display panel 111 with a LCD panel and a LCD drive circuit not shown.

Figure 4B:
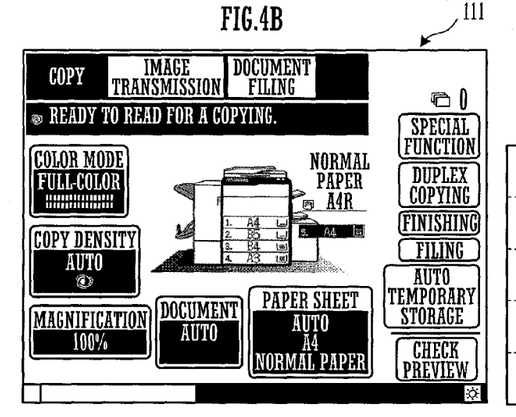
FIG. 4(B) is an example of an image to display on a display section.

On the display panel 111 of the display section 11, varieties of information for printing such as images for a copy setting screen as shown in FIG. 4(B) and so forth is displayed on a display area. The control section 22 controls content displayed on the display area of the display panel 111.

In the back portion of the display section 11 is disposed the lighting section 12.

Figure 4C:
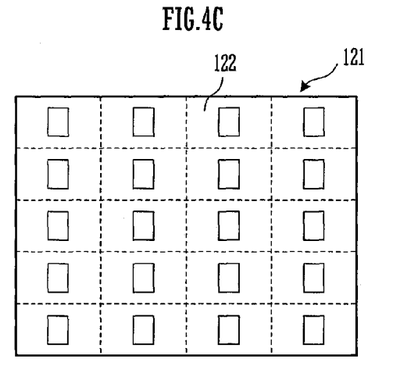
FIG. 4(C) is an example of configuration of a plurality of back light elements.

The lighting section 12 is a back light of the display panel 111. As shown in FIG. 4(C), the lighting section 12 includes a back light unit 121 (merely referred to as back light, hereinafter) having a plurality of LED's and a LED drive circuit not shown. In the figure is shown an e example in which twenty pieces of LED 122's are arranged in a matrix of 5 rows by 4 columns. The control section 22 controls light-on/light-off of each LED 122 by the LED drive circuit, individually. For example, as shown in FIG. 4(E), the control section 22 can perform a control in such a manner as to cause only a LED 122 of an upper right edge to be turned on and thereby to cause only a number-of-sheets-to-print portion of the copy setting screen to be displayed.

The touch operating section 10 is disposed at a front portion of the display section 11. The touch operating section 10 includes a touch panel 101 and a touched position detecting circuit not shown.

The operating section 13 is disposed at a right portion of the panel unit 9. The operating section 13 includes a plurality of operation buttons such as a start button 131 for copy and/or fax, a set of numeric keys 132, a function-select button 133, an all-lights-off button 134 and an all-lights-on button 135.

The multifunctional apparatus 1 is one embodiment of an image forming apparatus according to an embodiment of the present invention, and provided with a print function, a copy function and a fax function.

The print function is a function that performs printing based on print jobs the multifunctional apparatus 1 receives from the computers 2-1 through 2-N to produce printed matters.

The computers 2-1 through 2-N each have a built-in printer driver, and each generate a print job to cause the multifunctional apparatus 1 to print document data and/or image data according to an operation of each user. Then, the computers 2-1 through 2-N each transmit the print job to the multifunctional apparatus 1 through the LAN 6. The print job includes information on the user who ordered the print job and information on various kinds of settings for printing and the like, in addition to the data to print.

If the communications section 21 as the receiving section of the present invention receives a print job through the LAN 6, the control section 22 of the multifunctional apparatus 1 causes the image data included in the print job to be output to the image processing section 20. Also, the control section 22 changes settings of the image processing section 20 and the image forming section 16 based on the settings for printing included in the print job.

When color image data are inputted, the image processing section 20 separates the color image into monochromatic images of yellow, magenta, cyan and black, and outputs the respective monochromatic images to the image forming section 16.

The image forming section 16 forms single color toner images based on the inputted monochromatic images, and generates a color toner image by superimposing the respective single color toner images. Then, the image forming section 16 transfers the color toner image onto a paper sheet conveyed to a transfer position by the paper feeding section 17, and subsequently causes a fuser unit to fix the color toner image on the paper sheet. The paper discharge section 18 discharges a printed matter that is the paper sheet on which the color toner image has been fixed to the paper receiving tray (not shown) of a paper discharge section.

The copy function is a function that reads an image of a document at the image reading section 15 and produces a printed matter copying the document based on the print job accepted at the operating section 13.

The control section 22, upon the function-select button 133's being operated and thereby the copy function's being selected, and then subsequently upon accepting setting of a copy condition carried out through an operation on the touch panel 101 and the set of numeric keys 132, performs settings of the accepted copy condition onto the image processing section 20 and the image forming section 16. At this moment, the control section 22 causes all the LED's of the back light 121 to be turned on so that entire display area of the display panel 111 is illuminated, and causes the display panel 111 to display information that depends on the accepted operation. Then, the control section 22, upon accepting an operation of the start button 131, causes a document to be conveyed to a document table when the document is placed on the document conveying section 14 and then to move to the image reading section 15. The image reading section 15 reads an image of the document having been conveyed by the document conveying section 14 or the document placed on the document table. The image reading section 15 outputs data of the read image to the image processing section 20. The multifunctional apparatus 1 performs, from this onward, the same processes as when the print function is selected, and discharges a printed matter to the paper discharge section 18.

The fax function is functions to transmit image data to and receive image data from the Internet Fax apparatus 4 or the Fax machine 5. Here, since this functions is not directly related to the present invention, detailed description thereof is omitted.

The multifunctional apparatus 1, upon accepting a run order of a print job and then carrying out a printing or copying, stores in the memory section 19 information on the print job that was carried out. Information to store in the memory section 18 includes, for example, kind of the print job, receipt number of the print job, information on a user who ordered the run of the print job, date and time when the print job was carried out, number of sheets printed, output paper size, IP address of an instrument that received the print job and so forth.

The computers 2-1 through 2-N are those configured in the same manner as generally used known personal computers. Thus, configurations thereof are not described in detail.

First Embodiment

Subsequently, a first embodiment of the present invention is explained. In this embodiment, the multifunctional apparatus 1 turns off the entire back light 121, if the entire back light 121 is in a state of keeping being turned on when the start button 131 is operated or when a print job is received from an externally connected instrument. Functioning of the multifunctional apparatus 1 is explained below in detail, based on the flow chart shown in FIG. 5.

When a power supply is turned on, the control section 22 of the multifunctional apparatus 1 performs initializing. In other words, the control section 22 reads out a control program from the memory section 19, and performs it. The control section 22 also reads out from the memory section 19 data for a menu screen which is the initial screen. Then, the control section 22 causes the entire display area of the display panel 111 to display the copy setting screen shown in FIG. 4(B) or FIG. 6(H). Also, the control section 22, as shown in FIG. 4(C) or FIG. 6(G), causes all the LED's of the back light 121 to be turned on (S1).

Figure 5:
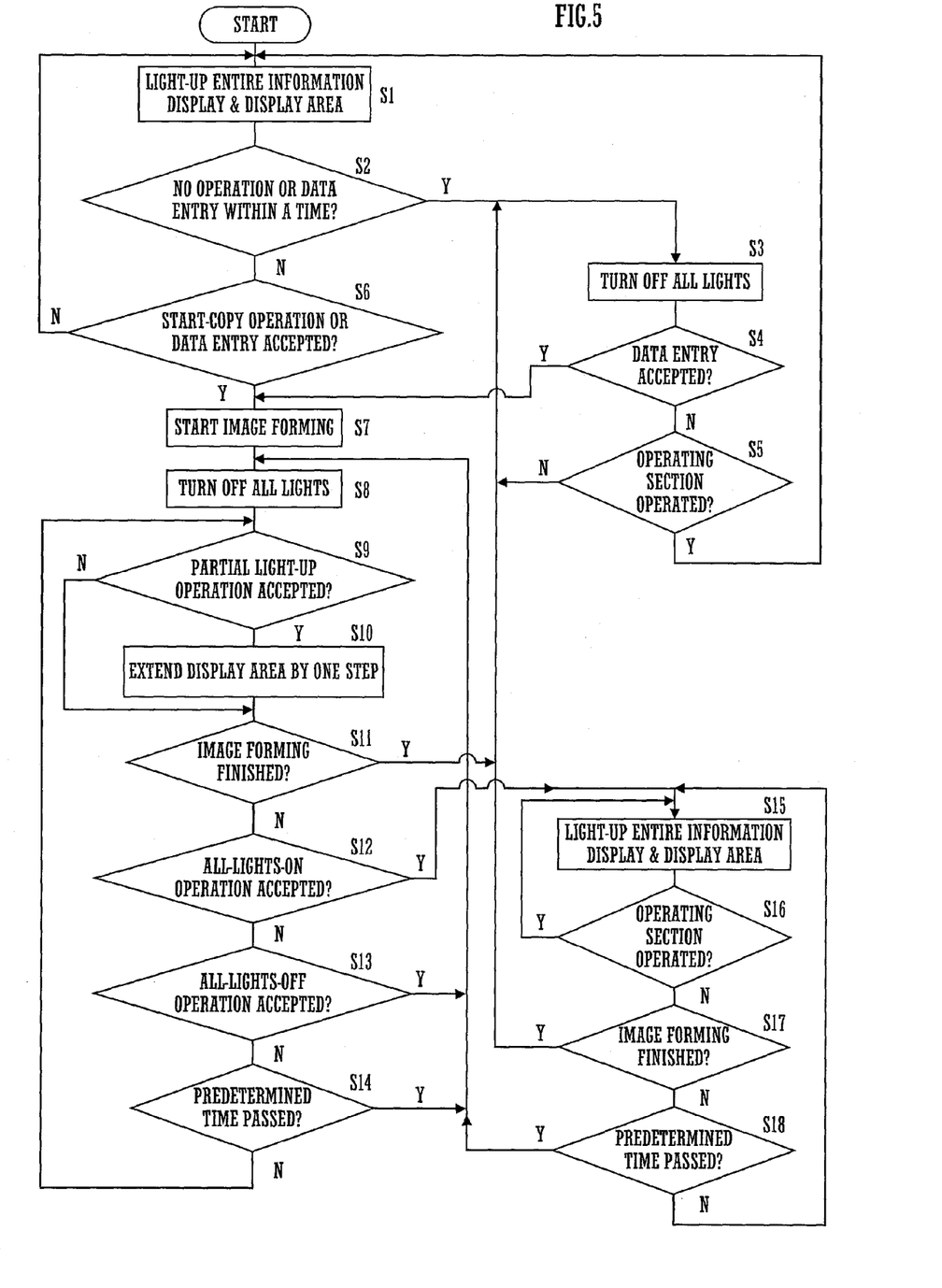
FIG. 5 is a flow chart explaining processes of a first embodiment.

When ready to perform a print job, the control section 22 starts timing for a predetermined period of time (for example, 3 minutes), and waits for an acceptance of an operation at the operating section 13 or a reception of a print job from a personal computer 210 at the communications section 180 (wait until an image forming is performed) (S2:N,S6:N).

Figure 6A:
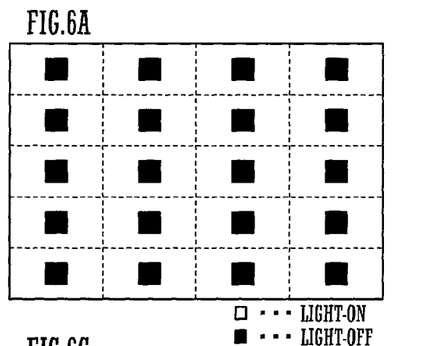
FIG. 6(A) is a diagram showing a state in which all of the plurality of back light elements are turned off.
Figure 6B:
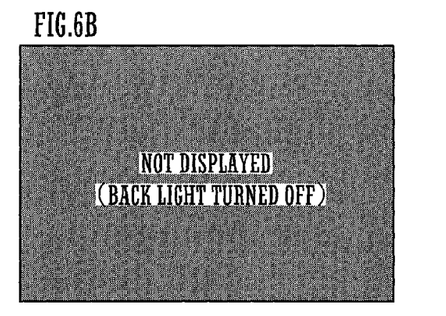
FIG. 6(B) is a diagram showing a display section when the plurality of back light elements are in the state shown in FIG. 6(A).
Figure 6C:
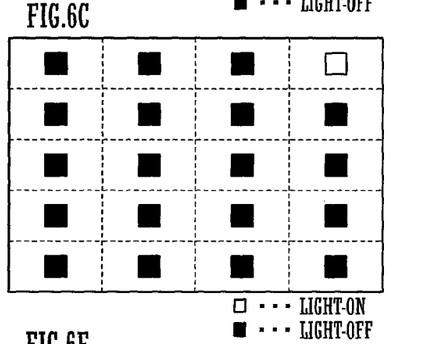

If the operating section 13 has not accepted any operation to start a print job or if the communications section 21 has not received any print job from any of externally connected instruments (S2:Y) after the passage of the predetermined period of time, the control section 22 causes all the LED's of the back light 121 to be turned off (S3) (refer to FIG. 6(A)). Then, the control section 22, as shown in FIG. 6(B), also stops display of information on the display panel 111. By so doing, power consumption of the display panel 111 can also be reduced.

As long as the communications section 21 does not receive any print job from any externally connected instruments such as computer 2-1 (S4:N) and the touch operating section 10 or the operating section 13 does not accept any operation (S5:N), the control section 22 continuously keeps on causing all the LED's of the back light 121 to be turned off (S3).

If the touch operating section 10 or the operating section 13 accepts an operation (S5:Y) during the time that the image forming section 16 is waiting (on standby) for an image forming and that all the LED's are kept turned off (S2:Y,S3, S4:N), the control section 22 performs a process of step S1.

Figure 7A:
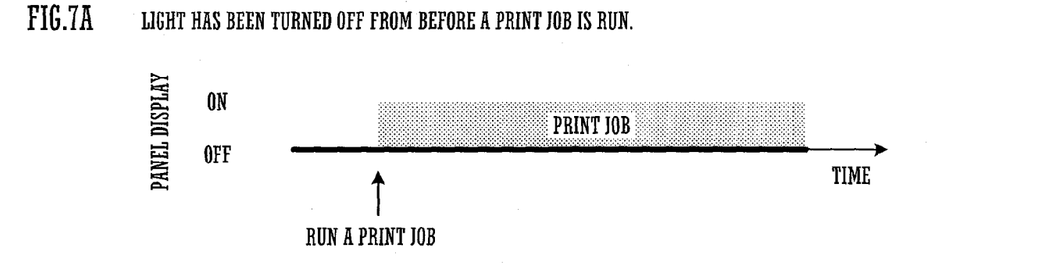
FIG. 7(A) shows the case in which the back light has been turned off before a printing starts.

Also, if the communications section 21 receives a print job from an externally connected instrument (S4:Y), the control section 22 starts an image forming (S7), and then subsequently causes all the LED's of the back light 121 to be turned off (refer to S8, FIG. 7(A)). This is because of the reason that display is useless since a user cannot look at the display screen of the display section 11 when a print job received from an externally connected instrument is performed. This can yield a reduction in power consumption of the back light.

Figure 7B:
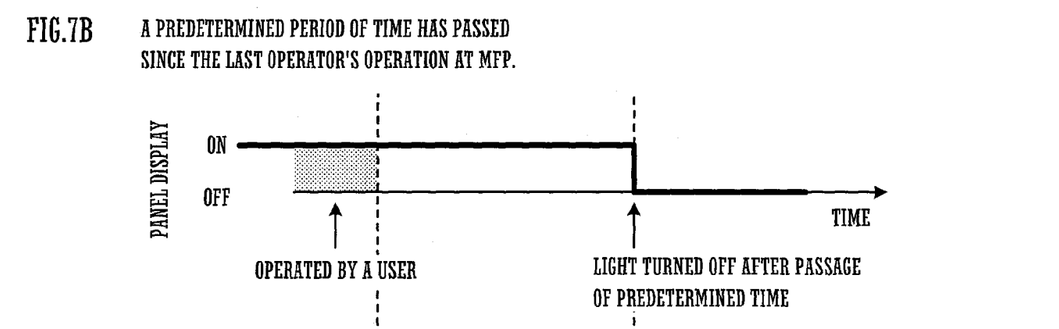
FIG. 7(B) and FIG. 7(C) show cases in which a predetermined period of time is in the course of elapsing after a user operated an operating section.

Similarly, if a predetermined period of time has passed (S2:Y), the control section 22 also causes all the LED's of the back light 121 to be turned off (refer to S3, FIG. 7(B)).

Figure 7C:
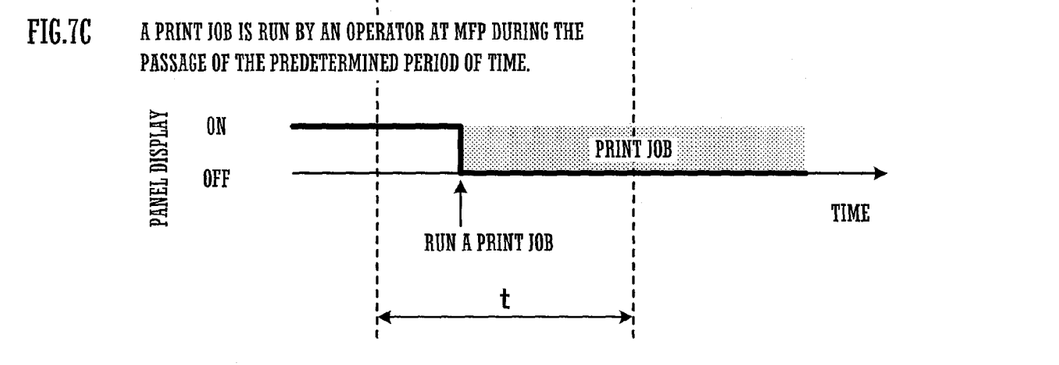
Figure 7D:
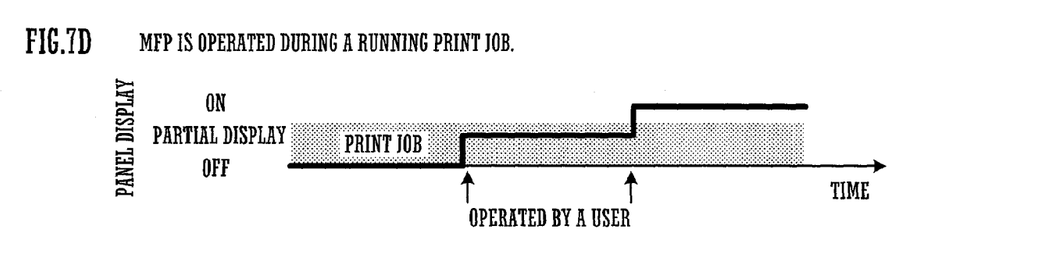
FIG. 7(D) shows a case in which the operating section was operated during the printing.

If the operating section 13 accepts a copy start operation, or if the communications section 21 receives a print job from an externally connected instrument (S2,:, N, S6,:, Y) until a predetermined period of time passes during the time that all the LED's of the back light 121 are kept turned on, the control section 22 causes the image forming section 16 to start an image forming (S7). Also, the control section 22 causes all the LED's of the back light 121 to be turned off (refer to S8, FIG. 7(C)).

If the touch operating section 10 or the operating section 13 (except for the all-lights-off button 134 and the all-lights-on button 135) accepts an operation (also referred to as partial light-up operation, hereinafter) (S9:Y) during the time that an image forming is performed and that all the LED's of the back light 121 are kept turned off, the control section 22 causes part of the LED's of the back light 121 to be turned on. Also, the control section 22 causes a partial display region of the display panel 111 illuminated by the part of the LED's of the back light 121 to display information for printing (S10).

Figure 4D:
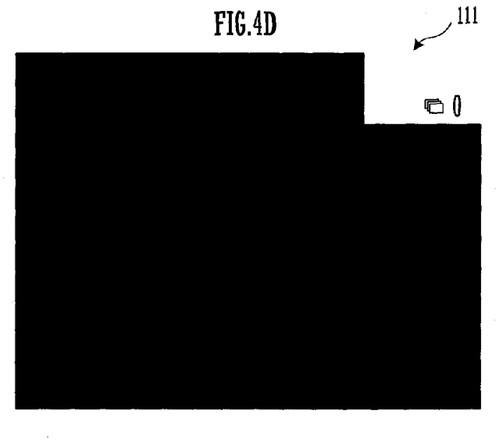
Figure 4E:
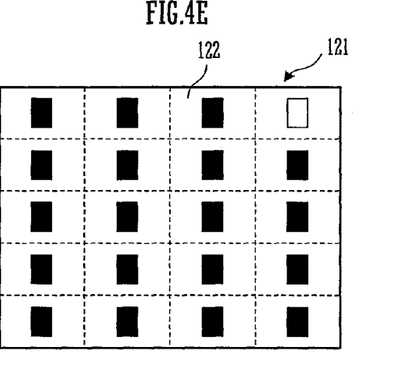
Figure 6D:
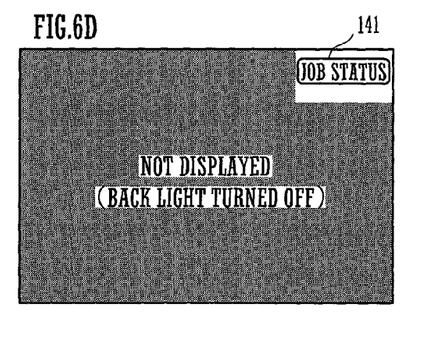
FIG. 6(D) is a diagram showing the display section when the plurality of back light elements are in the state shown in FIG. 6(C).
Figure 9A:
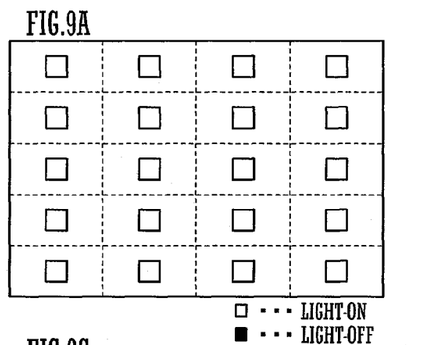
Figure 9B:
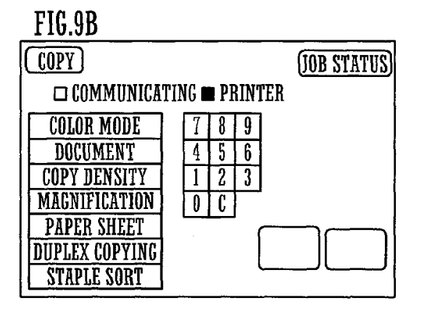
FIG. 9(B) is a diagram showing the display section when the plurality of back light elements are in the state shown in FIG. 9(A).
Figure 9C:
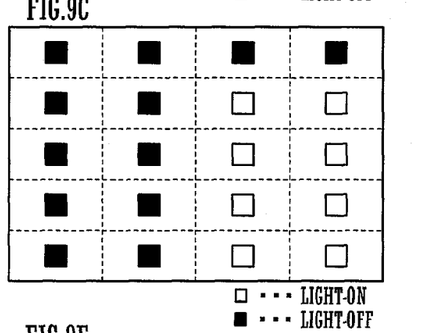
Figure 9D:
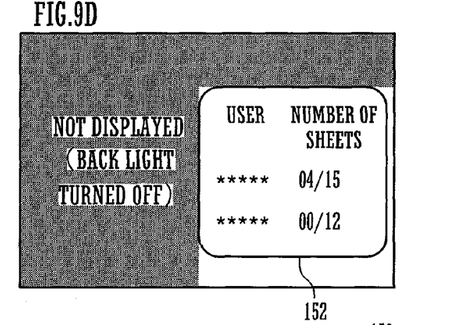
FIG. 9(D) is a diagram showing the display section when the plurality of back light elements are in the state shown in FIG. 9(C).
Figure 9E:
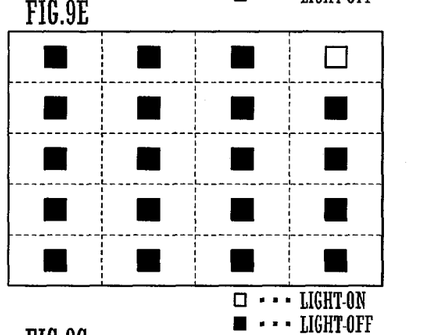
Figure 9F:
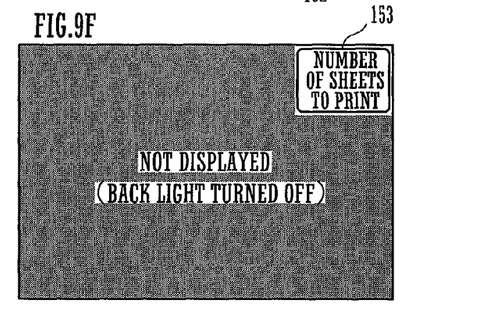
FIG. 9(F) is a diagram showing the display section when the plurality of back light elements are in the state shown in FIG. 9(E).

For the information to display on the partial display region, it can cause only part (number-of-sheets-to-print portion) of the copy setting screen to be displayed without changing the content of the screen, as shown in FIG. 4(D). It can also cause a screen different from the copy setting screen to be displayed. For example, displaying a display button 141 to display a job status screen shown in FIG. 6(D), and/or information on current status of an ongoing print job (number of printed sheets and total number of sheets for the print job) 153 as shown in FIG. 9(F) is helpful.

The control section 22 starts timing for a predetermined period of time in step S10.

After performing the step S10, the control section 22 repeats the processes of step S9 through S14 if an image forming is not finished (S11:N), and if there is no touching operation (S12:N) either on the all-lights-on button 135 or on a region (touch panel 101) for which LED 122's are kept turned off, and if there is no operation (S13:N) on the all-lights-off button 134, and if a predetermined period of time has not elapsed (S14:N), and if there is no partial light-up operation at the operating section 13 (S9:N).

Figure 6E:
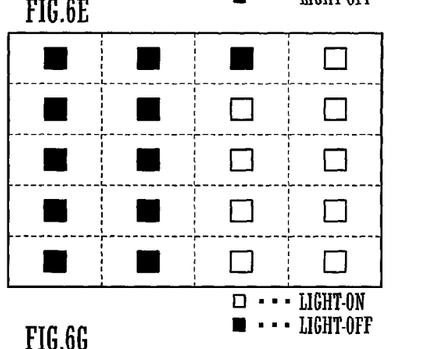
Figure 6F:
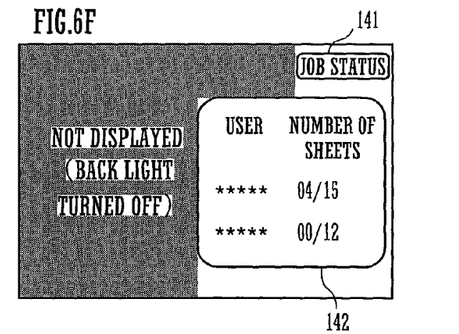
FIG. 6(F) is a diagram showing the display section when the plurality of back light elements are in the state shown in FIG. 6(E).
Figure 6G:
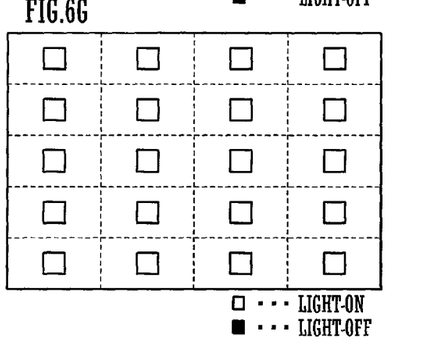
Figure 6H:
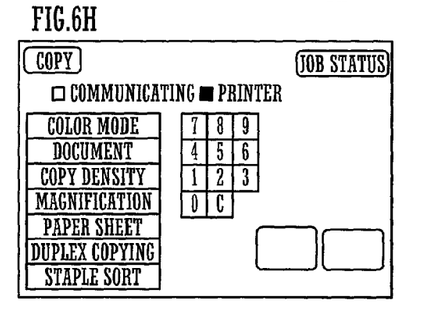
FIG. 6(H) is a diagram showing the display section when the plurality of back light elements are in the state shown in FIG. 6(G).

If there is a further partial light-up operation (S9:Y) during the time that an image forming is performed, the control section 22 expands the display area (S10) For example, as shown in FIG. 6(E), it expands a region, namely the partial display region, for which part of the LED's of the back light 121 are turned on. Besides, with the expansion of the partial display region, it causes the content displayed on the display panel 111 to increase to display the specified information, as shown in FIG. 6(F). Displayed in FIG. 6(F) is information on job status 142 as specified information, for example. The information on job status 142 includes information on order in a queue of print jobs the image forming section performs and information representing current status of an ongoing image forming the image forming section is performing. In other words, as the information on order in a queue of print jobs the image forming section performs, an ongoing print job and an order to perform a print job awaiting a run are displayed. Additionally, a user name who ordered the print job and information on current status of a print job (number of printed sheets and total number of sheets to print) are displayed.

If there is an acceptance of an operation to cause the entire back light 121 to be turned on (S12:Y) during the time that an image forming is performed and that the LED's of the back light 121 are either entirely kept turned off or partly kept turned on, the control section 22 causes all the LED's of the back light 121 to be turned on, causes an entire display area of the display panel 111 to display a default screen (refer to FIG. 4(B)) for copying, and then accepts an operation of an user. And again, it starts timing of a predetermined period of time (S15).

Moreover, it is either when an operation of the all-lights-on button 135 is accepted or when a touching operation is accepted at a region for which the back light 121 is not turned on during the time that part of the back light 121 is kept turned on that the control section 22 causes the entire back light 121 to be turned on.

The control section 22 repeats processes of steps S15 through S18 if any of an operation on the touch operating section 10 or on the operating section 13 (S16:N), an end of an image forming (S17:N), or a passage of a predetermined period of time (S18:N) does not occur. Also, if an operation of the touch operating section 10 or the operating section 13 is accepted, the control section 22 accepts content of the operation (S15, S16:Y).

If a predetermined period of time has passed (S18:Y), the control section 22 causes all the LED 122's of the back light 121 to be turned off (S8). Then, it performs processes from the step S9 onward.

If an image forming process of the image forming section 16 is finished (S17:Y), the control section 22 causes all the LED 122's of the back light 121 to be turned off (S3). Then, it performs processes from the step S4 onward.

On the other hand, if the all-lights-off button 134 is operated (S11:N, S12:N, S13:Y) or if a second predetermined period of time (5 seconds) has passed (S14:Y) following the step S10, the control section 22 causes all the LED's of the back light 121 to be turned off (S8). Then, it performs processes from the step S9 onward.

When the image forming process is finished (S11:Y), the control section 22 turns off all the LED 122's of the back light 121 (S3), and performs processes from the step S4 onward.

In this manner, with the multifunctional apparatus 1, because all the LED's of the back light 121 are turned off when a printing is started, power consumption of the back light can be reduced. Further, because the partial display region of the back light is expanded from the state where the entire back light is turned off according to the number of times of operation at the touch operating section 10 or the operating section 13, power consumption of the back light can be prevented from increasing abruptly.

Further, the process of turning off the back light 121 if the entire back light 121 is in a state of keeping being turned on when the start button 131 is operated or when a print job is received from an externally connected instrument can also be applied to the back light configured so as to cause the entire display area of the display panel to be turned on/off.

Second Embodiment

Subsequently, a second embodiment of the present invention is explained. In this embodiment, the multifunctional apparatus 1 gradually turns off the entire back light 121, if the entire back light 121 is in a state of keeping being turned on when the start button 131 is operated or when a print job is received from an externally connected instrument. Functioning of the multifunctional apparatus 1 is explained below in detail, based on the flow chart shown in FIG. 8. Here, the same processes as in the flow chart shown in FIG. 5 are given the same signs, and detailed descriptions thereof are omitted.

Figure 8:
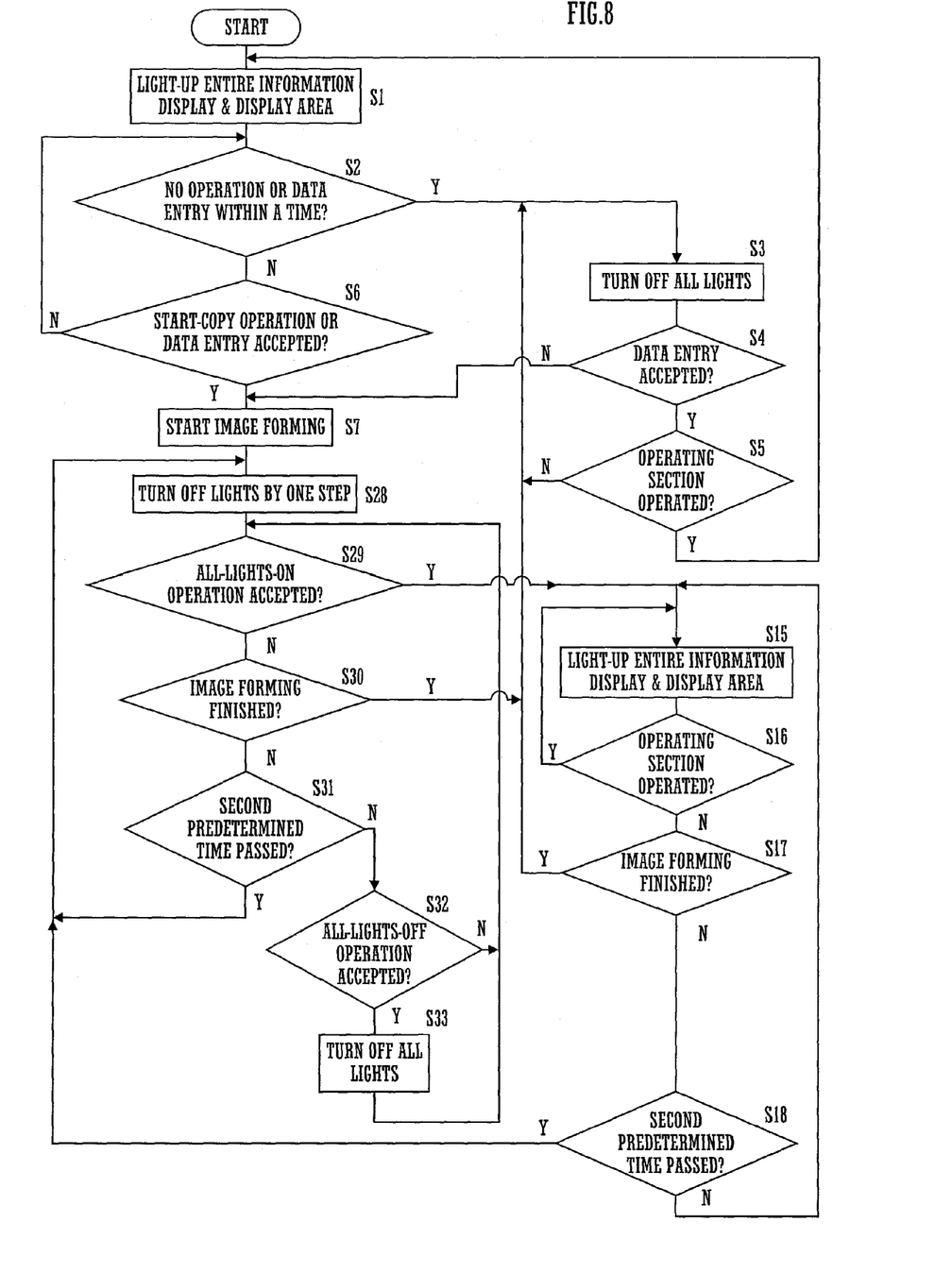
FIG. 8 is a flow chart explaining processes of a second embodiment.

When the power supply is turned on, the control section 22 of the multifunctional apparatus 1 performs initializing in the same manner as the first embodiment, and causes the entire display area of the display panel 111 to display the copy setting screen, and causes all the LED's of the back light 121 to be turned on (S1). The control section 22 performs the processes from the step S1 to S7 in the same manner as those explained based on FIG. 5. Here, the control section 22 causes all the LED's of the back light 121 to be turned on (S1) if the touch operating section 10 or the operating section 13 accepts an operation (S5:Y).

After causing the image forming section 16 to start an image forming (S7), the control section 22 causes the back light 121 to be gradually (stepwise) turned off from the state where all the LED's of the back light 121 are turned on until finally the entire back light 121 is turned off (S28).

First, the control section 22 causes part of the back light to be turned off, if all the LED 122's of the back light are in a state of keeping being turned on when the image forming section starts an image forming. And the control section 22 causes a partial display region of the display panel 111 which is illuminated by part of the LED 122's that are kept tuned on even after the other part of the LED 122's are turned off to display information for printing.

It can also cause the partial display region to display only part (number-of-sheets-to-print portion) of the copy setting screen without changing the content of the screen, as shown in FIG. 4(D). Further, it can also cause a screen different from the copy setting screen to be displayed. For example, as shown in FIG. 9(D), information on job status 152 is displayed. The information on job status 152 includes information on order in a queue of print jobs the image forming section performs and information representing current status of an ongoing image forming the image forming section is performing. In other words, as the information on order in a queue of print jobs the image forming section performs, an ongoing print job and an order to perform a print job awaiting a run are displayed. Additionally, a user name who ordered the print job and information on current status of a print job (number of printed sheets and total number of sheets to print) are displayed.

When causing the partial display region to display the information for printing in step S28, the control section 22 starts timing of the second predetermined period of time (for example five seconds).

The control section 22 repeats processes of steps S29 through S32 during the time that any of an operation of the all-lights-on button 135 (S29:N), an end (S30:N) of an image forming process, a passage of the second predetermined period of time (S31:N), or an operation of the all-lights-off button 134 (S32:N) does not occur.

If the all-lights-off button 134 is operated (S32Y), the control section 22 causes all the LED's of the back light to be turned off. Then, it performs processes from the step S29 onward.

If the all-lights-on button 135 is operated (S29:Y), the control section 22 causes all the LED's of the back light to be turned on, and performs the steps S15 through S18' explained based on FIG. 5. Further, if the second predetermined period of time has passed (S18':Y), it causes the plurality of LED's of the back light 121 to be turned off by one step (S28).

If the second predetermined period of time has passed (S31:Y), the control section 22 causes the plurality of LED's of the back light 121 to be turned off by additional one step (S28). For example, the control section 22 causes part of the plurality of LED 122's to be turned off, thereby changing the state thereof from a state shown in FIG. 9(C) to a state shown in FIG. 9(E). Besides, content of display on the display panel 111 is caused to change from the screen showing the information on job status shown in FIG. 9 (D) to information on current status of an ongoing print job (number of printed sheets and total number of sheets to print for the ongoing print job) shown in FIG. 9(F).

Figure 9G:
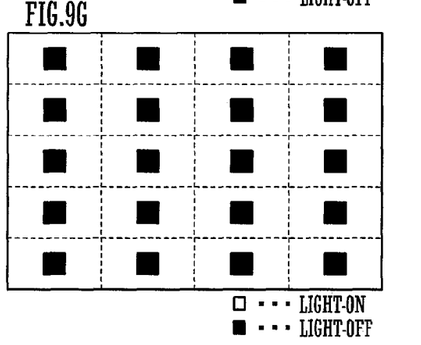
FIG. 9(G) is a diagram showing a state in which all of the plurality of back light elements are turned off.
Figure 9H:
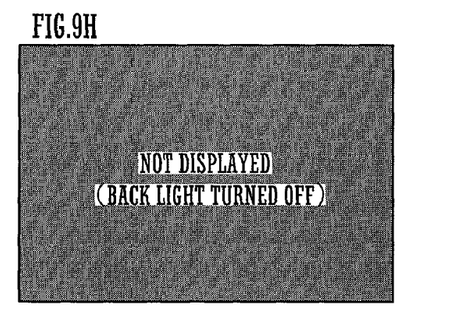
FIG. 9(H) is a diagram showing the display section when the plurality of back light elements are in the state shown in FIG. 9(G).

Then, the control section 22 repeats the processes of the steps S29 through S32, and causes the plurality of LED's of the back light 121 to be turned off by further one step (S28) if another further predetermined period of time has passed (S31, Y). For example, the control section 22 causes the part of the plurality of LED 122's to be turned off further, and changes the state thereof from the state shown in FIG. 9(E) to a state shown in FIG. 9(G) (where all the LED's are turned off). In addition, once causing all the LED's of the back light 121 to be turned off, the control section 22 keeps all the LED's turned off even after the predetermined period of time has passed further. It is often the information representing current status of an ongoing image forming performed by the multifunctional apparatus 1 that users of the image forming apparatus usually want to look at. In such cases, as shown in FIG. 9(D) and FIG. 9(F) and as discussed above, displaying the information on current status of an ongoing print job until all the LED 122's of the back light 121 are turned off enables a user to get necessary information without any operation at the operating section.

When an operation of the all-lights-off button 134 is accepted (S32:Y), the control section 22 causes all the LED 122's of the back light 121 to be turned off (S33), and performs the processes from the step S29 onward.

When an image forming process is finished (S30:Y), the control section 22 causes all the LED 122's of the back light 121 to be turned off (S3), and performs the processes from the step S4 onward.

In this manner, with the multifunctional apparatus 1, since the plurality of LED 122's configuring the back light 121 are gradually turned off after a printing is started, power consumption of the back light can be reduced.

The above explanations of the embodiments are nothing more than illustrative in any respect, nor should be thought of as restrictive. Scope of the present invention is indicated by claims rather than the above embodiments. Further, it is intended that any changes that are equivalent to a claim in the sense and realm of the doctrine of equivalence be included within the scope of the present invention.

What is claimed is:

1. An image forming apparatus comprising:
   an operating section accepting an operation by a user;
   a receiving section receiving data for a print job from an externally connected instrument;
   an image forming section starting an image forming based on a print job if the operating section accepts an operation to start the print job or if the receiving section receives data for the print job;
   a display section displaying varieties of information for printing on a display area;
   a lighting section illuminating the display section from a back portion thereof and being capable of turning on part by part; and
   a control section causing lighting of the lighting section to be turned off gradually part by part until finally turned off entirely if entire lighting of the lighting section is in a state of keeping being turned on when the image forming section starts an image forming.

2. The image forming apparatus as claimed in claim 1 wherein the control section
   causes part of the lighting of the lighting section to be turned on if the operating section accepts an operation during the time that the image forming section is performing an image forming and that the lighting of the lighting section is kept turned off, and
   causes a partial display region illuminated by the part of the lighting of the lighting section to display the information.

3. The image forming apparatus as claimed in claim 2 wherein the control section,
   includes a function to control content displayed on the display area of the display section,
   causes the partial display region to display specified information.

4. The image forming apparatus as claimed in claim 3 wherein
the specified information is information representing current status of an ongoing image forming the image forming section is performing.
5. The image forming apparatus as claimed in claim 3 wherein
the specified information is information on order in a queue of print jobs the image forming section performs.
6. The image forming apparatus as claimed in claim 2 comprising a touch operating section accepting a touching operation by a user, installed at a front portion of the display section, wherein
the control section,
includes a function to control content displayed on the display area of the display section,
causes the partial display region to display a display button, and
causes the partial display region to display the specified information if the touch operating section accepts a touching operation of the display button.
7. The image forming apparatus as claimed in claim 6 wherein the control section
causes the entire lighting of the lighting section to be turned on if the operating section or the touch operating section accepts a specified operation during the time that the image forming section is performing an image forming and that the part of the lighting of the lighting section is kept turned on.
8. The image forming apparatus as claimed in claim 7 wherein the operating section includes a light-off button causing the entire lighting of the lighting section to be turned off.
9. The image forming apparatus as claimed in claim 2 wherein the control section
causes the entire lighting of the lighting section to be turned off if the part of the lighting of the lighting section is in a state of keeping being turned on when the image forming section finishes an image forming.
10. The image forming apparatus as claimed in claim 9 wherein the control section
causes the entire lighting of the lighting section to be turned on if the operating section or the touch operating section accepts an operation during the time that the image forming section is waiting for an image forming and that the entire lighting of the lighting section is kept turned off.
11. The image forming apparatus as claimed in claim 1 wherein
the control section
causes the partial display region illuminated by the part of the lighting of the lighting section that is turned on to display information representing current status of an ongoing image forming the image forming section is performing until the entire lighting of the lighting section is turned off.

* * * * *